United States Patent [19]

Lupo et al.

[11] 3,815,731

[45] June 11, 1974

[54] ORIENTING FEED MECHANISM

[75] Inventors: Fritz J. Lupo, Bloomfield Hills;
Douglas E. Brining, Southfield, both of Mich.

[73] Assignee: Feedmatic-Detroit, Inc., Southfield, Mich.

[22] Filed: Dec. 11, 1972

[21] Appl. No.: 313,842

[52] U.S. Cl................... 198/288, 221/159, 221/160
[51] Int. Cl............................................. B65g 47/24
[58] Field of Search........... 198/33 R; 221/159, 160, 221/172

[56] References Cited
UNITED STATES PATENTS
1,897,116  2/1933  Friedman............................ 221/159
2,728,091  12/1955  Hoenk................................ 221/159

Primary Examiner—Richard E. Aegerter
Assistant Examiner—Richard K. Thomson
Attorney, Agent, or Firm—Whittemore, Hulbert & Belknap

[57] ABSTRACT

Mechanism for feeding small parts having a laterally facing surface inwardly of the edges and at one side only thereof. The parts are pushed along a track having a flange supporting the part by an edge, and a ledge engageable with the laterally facing surface. There is a gap in the flange track and unless the side of the part having the laterally facing surface is adjacent the ledge, the part falls off the track.

7 Claims, 9 Drawing Figures

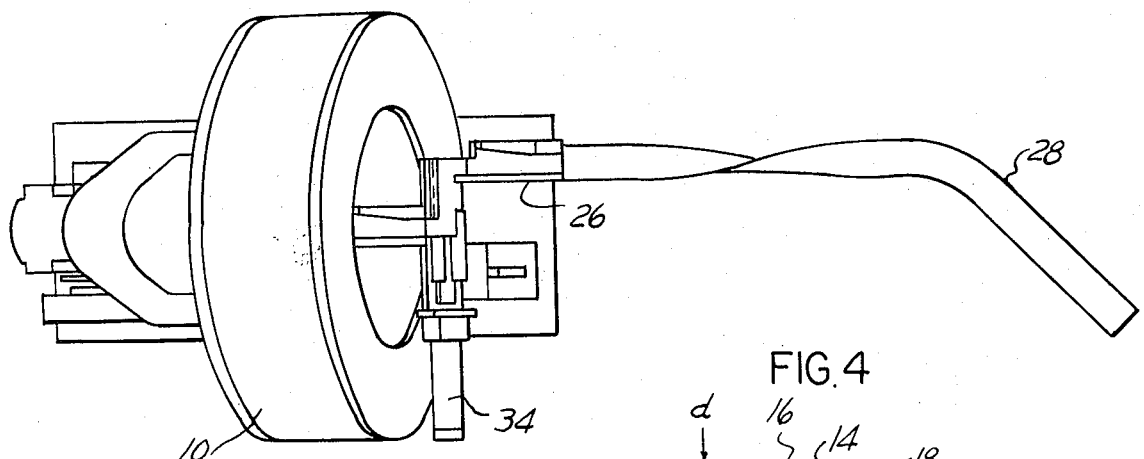
FIG. 1
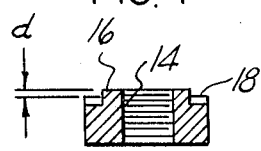
FIG. 4
FIG. 5
FIG. 3
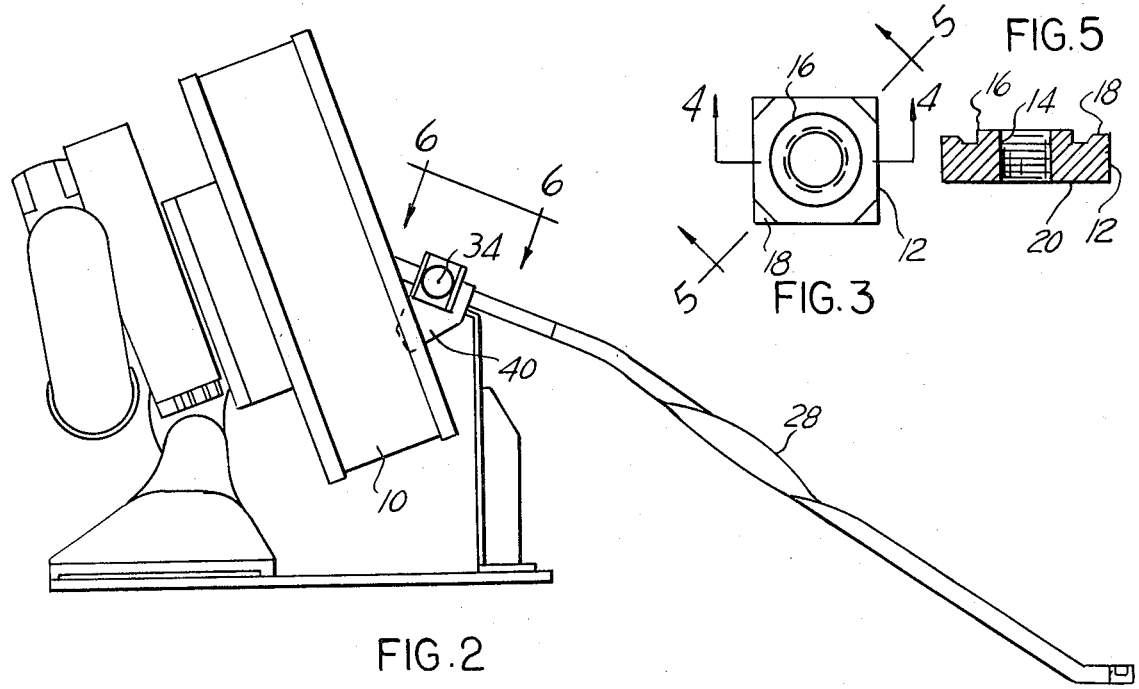
FIG. 2

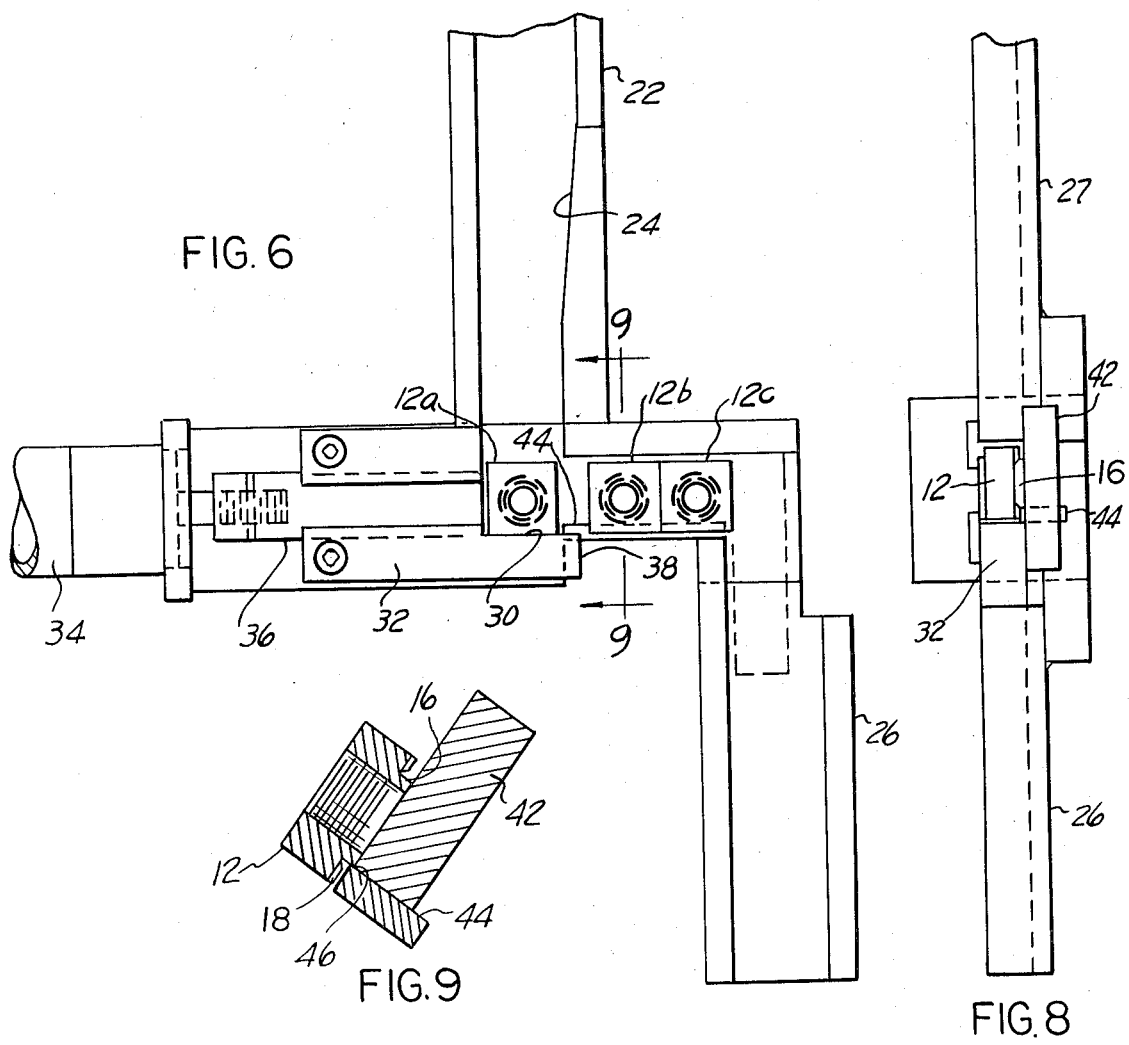
FIG. 6
FIG. 9
FIG. 8
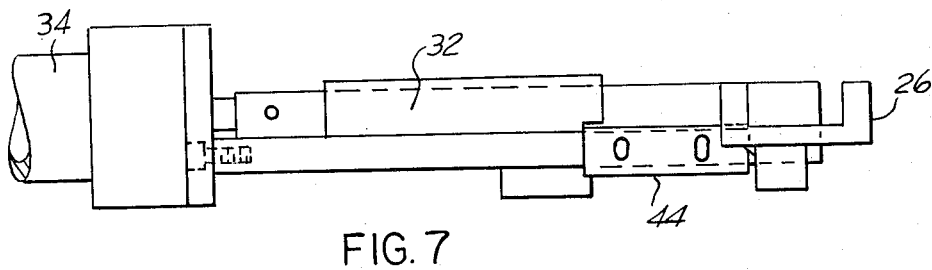
FIG. 7

3,815,731

ORIENTING FEED MECHANISM

BRIEF SUMMARY OF THE INVENTION

In feeding small parts which have a required orientation as to which of two opposite sides are presented at an operation station, means are provided which advance a sequence of parts without regard to which side is presented, so that approximately half of the parts would be inverted. In accordance with the present invention, the parts are advanced along an inclined track which has a surface engaging an edge of each part, and having a gap in the surface which permits a part to drop through to reject the part unless it is otherwise supported.

In the present invention the equipment is designed to feed and orient parts which have one side only provided with a projection which has a surface which faces laterally toward an adjacent edge of the part, but is spaced inwardly from the edge of the part. The opposite side of the part is smooth.

An example of such a part is a so-called piloted weld nut. Nuts of this type have welding projections at one side at the corners and surrounding the threaded opening through the nut is a piloting collar which extends very slightly above the plane occupied by the tops of the welding projections. For example, the top of the piloting collar may project between 0.010–0.035 inch above the plane occupied by the tops of the welding projections.

Adjacent the gap in the surface along which the parts are advanced is a very shallow ledge adapted to engage the top portion of the piloting collar. The track is inclined so that the nut is supported by the engagement between the ledge and its piloting collar and thus, to traverse the gap in the surface which supports a side of the nut.

With this arrangement it will be observed that the position sensing structure is insensitive to the thickness of the weld nut.

BRIEF DESCRIPTION OF THE DRAWINGS

FIG. 1 is a plan view of the orienting feed mechanism.

FIG. 2 is a side elevation of the mechanism.

FIG. 3 is a plan view of a piloted weld nut for which the mechanism is suitable.

FIG. 4 is a section on the line 4—4, FIG. 3.

FIG. 5 is a section on the line 5—5, FIG. 3.

FIG. 6 is a fragmentary elevational view looking in the direction of the arrows 6—6, FIG. 2.

FIG. 7 is a projected view of the structure shown in FIG. 6 as seen from the bottom of the sheet.

FIG. 8 is a projected view of the structure shown in FIG. 6 looking to the left in FIG. 6.

FIG. 9 is an enlarged sectional view on the line 9—9, FIG. 6.

DETAILED DESCRIPTION

The orienting feed mechanism comprises a hopper 10 of the vibratory type which is adapted to advance a sequence of small articles such for example as weld nuts, from a mass of such articles, without reference to their orientation. The parts for which the present mechanism is designed are piloted weld nuts which are illustrated in detail in FIGS. 3, 4 and 5.

These nuts, as shown, comprise generally rectangular bodies 12 having a central threaded opening 14 surrounded by a piloting collar 16 and provided at its corners with welding projections 18. As best seen in FIG. 4, the piloting collar 16 projects slightly beyond the plane containing the crests of the welding projections 18. The amount of such projection is indicated at $d$ in FIG. 4 and in general, this dimension is 0.010–0.035 inch. The side of the nut opposite to the welding projections and piloting collar is a plane surface as indicated at 20 in FIG. 5.

Since the parts are received in an unoriented mass within the hopper 10, they are advanced from the hopper in a sequence completely at random as to the location of the side provided with the welding projections and the piloting collar.

The present arrangement is provided to individually sense the orientation of each of the articles as it advances toward an assembly station and to reject those which are improperly oriented. In practice, since the orientation is completely random, approximately half of the articles will be misoriented. The articles which are not properly oriented are simply rejected and returned to the hopper for a subsequent advance. As the articles are advanced by selective vibration out of the hopper 10, they are received on a track 22, best seen in FIG. 6, the track having an inclined surface 24 which is adapted to assure that the nuts 12 are turned to the full line position shown in the Figure. This initial orientation, as will be apparent, has nothing to do with whether or not the side of the article having the welding projections and piloting collar is uppermost or lowermost.

Means are provided for receiving the nuts in the position indicated at 12a in FIG. 6, and advancing them to the right as viewed in this Figure into alignment with a chute 26 from which the parts are delivered to a feed track 28.

In the position 12a the lower edge of the nut engages the surface 30 of a track element 32.

Means are provided for intermittently advancing the articles 12 and this means as illustrated comprises a fluid piston and cylinder device 34 having a pusher element 36, the free end of which is engageable with a side of the article in the position illustrated at 12a in FIG. 6. The stroke of the piston is such that the article is advanced from the position 12a to the position 12b and if a preceding article has not been rejected, it will be pushed to the position 12c by the article 12b. Any article which was not rejected ahead of the article in the position illustrated at 12c will have dropped down the chute 26. The track element 32 has an end 38 so that as the nuts 12 are advanced successively through the positions 12a, 12b and 12c, they will be rejected by the orienting device unless they are otherwise supported. Rejected articles are returned by a trough 40 directly to the hopper 10 for a subsequent advance.

The orienting and advancing mechanism best illustrated in FIGS. 3–9 includes the plate 42 which is shown in its proper spatial relationship in FIG. 9. At the lower edge of this plate 42 is a ledge element 44 positioned to engage the extreme outer end of the piloting collar 16 at the point identified in FIG. 9 as 46. The inclination of the plate 42 is such that a nut 12 whose collar 16 engages ledge 44 advances along the plate and traverses the gap provided by termination of the track surface 30 at 38.

Inasmuch as the extension of the edge of plate 44 beyond the upwardly facing surface of the plate 42 is only a few thousandths of an inch, it will not normally interfere with passage of improperly located nuts into the gap provided by termination of the track element 32. This is because the corner surfaces of the commercial nuts for which the apparatus is intended do not have perfectly square corners defined by the intersection between the side and edges of the nut.

While the foregoing has been described particularly with reference to advancing weld nuts having both piloting collars and welding projections, it will of course be apparent that the invention is capable of use with other parts. For example, weld nuts havng a piloting collar but not having welding projections would be equally well handled by the apparatus described.

The essential requirement calling for the advantages offered by the above described construction is for generally flat articles having one plane side, an edge surface or surfaces, and a portion at the opposite side intermediate the edges of the article which provides a supporting surface extending generally outwardly from the remaining surface portions at the opposite side.

From the foregoing it will be apparent that selection of properly oriented articles and rejection of improperly oriented articles is accompanied by advancing the articles in a continuous series along a trackway having three supporting surfaces. The first of these surfaces is the laterally inclined surface of plate 42 engaging one side of the articles. The second supporting surface is the surface 30 of track element 32 which extends longitudinally in parallelism to the first supporting surface but is perpendicular thereto so as to engage an edge of the articles. The third supporting surface is the upper surface of ledge 44 which projects beyond plate 42 and occupies a plane parallel to the plane occupied by the second supporting surface but upwardly and laterally offset therefrom and extends in such plane generally parallel to the extension of the second supporting surface.

The articles, as they are advanced along the trackway, are supported solely by these three surfaces and accordingly, the apparatus is insensitive to thickness of the articles.

What we claim as our invention is:

1. Apparatus for advancing a sequence of similarly oriented articles such as square weld nuts having at a first side a plane surface, edge surfaces perpendicular to the first side, and having opposite the first side a second side generally parallel to the first side and having a centrally located projection of circular cross-section spaced inwardly from the edge surfaces and extending outwardly beyond the remainder of the second side, said apparatus being insensitive to thickness of the articles and comprising a trackway having a first elongated horizontally extending, laterally inclined, upwardly facing support surface along which a series of articles are advanced and engageable with a side surface of the article irrespective of whether the first or second side of the article is adjacent the first support surface, a second horizontally extending, laterally inclined, upwardly facing support surface generally perpendicular to said first support surface and extending in a direction parallel to the direction in which said first support surface extends and positioned to engage an edge of the article, said first and second support surfaces defining a generally V-shaped upwardly open channel for engaging a side and edge of articles of the described configuration advanced thereover, said second support surface terminating short of an end of said first support surface, a delivery chute spaced from the termination of said second support surface to provide a gap in the channel providing for rejection of articles unless properly oriented as they advance into said gap, a horizontally extending ledge parallel to said second support surface and having a third laterally inclined, upwardly facing support surface extending outwardly slightly beyond said second surface and spaced upwardly from said first surface by an amount determined by the spacing of the nut projection inwardly from the edges thereof to engage a side of the centrally located projection of an article advanced along said support surfaces if the article has its second side adjacent thereto as it traverses said gap, and means for advancing random oriented articles to said gap, and for advancing properly oriented articles supported by said third support surface across said gap to said delivery chute.

2. Apparatus as defined in claim 1 further comprising a trough positioned to receive rejected articles and shaped to return them for a subsequent advance to said trackway.

3. Apparatus as defined in claim 1 further comprising a hopper, means associated with said hopper for advancing a series of articles in random orientation to one end of said trackway.

4. Apparatus as defined in claim 3 further comprising a feed device for pushing the article at the said one end of said trackway horizontally along the trackway so as to thereby push preceding articles therealong.

5. Apparatus as defined in claim 1 further comprising a trough positioned to return articles rejected at said gap by gravity to said hopper for subsequent advance.

6. Apparatus as defined in claim 4 in which said ledge has a projection laterally from said first support surface of 0.010–0.025 inch.

7. Apparatus as defined in claim 1 in which said articles are engaged solely by said three support surfaces so that the apparatus is insensitive to variations in thickness of the articles.

* * * * *